United States Patent
Tanaka et al.

(10) Patent No.: US 8,887,858 B2
(45) Date of Patent: Nov. 18, 2014

(54) EXHAUST DEVICE FOR WORK VEHICLE

(75) Inventors: Tomiho Tanaka, Tondabayashi (JP); Shinya Ukai, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/603,777

(22) Filed: Sep. 5, 2012

(65) Prior Publication Data
US 2013/0233431 A1 Sep. 12, 2013

(30) Foreign Application Priority Data
Nov. 30, 2011 (JP) ................................ 2011-262476

(51) Int. Cl.
F16L 9/19 (2006.01)
F01N 13/08 (2010.01)
F01N 13/14 (2010.01)

(52) U.S. Cl.
CPC ............... *F16L 9/19* (2013.01); *F01N 2260/20* (2013.01); *F01N 2470/24* (2013.01); *F01N 2590/08* (2013.01); *F01N 13/082* (2013.01); *F01N 13/14* (2013.01); *F01N 2260/022* (2013.01)
USPC ............ 180/296; 180/68.3; 180/309; 60/322; 285/144.1; 285/226; 285/235; 138/114

(58) Field of Classification Search
None
See application file for complete search history.

(56) References Cited

U.S. PATENT DOCUMENTS

| 5,069,487 | A | * | 12/1991 | Sheppard | ...................... | 285/226 |
| 5,641,348 | A | * | 6/1997 | Miller et al. | .................. | 106/38.3 |
| 5,988,308 | A | * | 11/1999 | Qutub | ............................ | 180/309 |
| 7,213,847 | B2 | * | 5/2007 | Umiastowski | ................ | 285/235 |
| 7,614,475 | B2 | * | 11/2009 | Askew | ........................... | 180/309 |
| 2008/0093151 | A1 | * | 4/2008 | Ogawa et al. | .................. | 180/296 |

FOREIGN PATENT DOCUMENTS

JP 771249 A 3/1995
JP 3799405 B2 * 7/2006

* cited by examiner

*Primary Examiner* — J. Allen Shriver, II
*Assistant Examiner* — Hilary L Johns
(74) *Attorney, Agent, or Firm* — The Webb Law Firm

(57) ABSTRACT

A curved-pipe portion curved so as to change the exhaust direction is provided to the downstream-side end section of the exhaust guide pipe and the external protective pipe, and the spacing between an end-section outer periphery of the exhaust guide pipe and an end-section inner periphery of the external protective pipe in the curved-pipe portion is configured so as to be greater on the side opposite the center of curvature of the curved-pipe portion than the side nearer thereto.

5 Claims, 8 Drawing Sheets

EXHAUST DEVICE FOR WORK VEHICLE

BACKGROUND OF THE INVENTION

1. Field of the Invention

The present invention relates to an exhaust device for a work vehicle provided with an exhaust pipe for guiding exhaust to the exterior of the vehicle body.

2. Description of the Related Art

Known exhaust devices for a work vehicle such as that mentioned above include the following.

Specifically, Japanese Patent 3799405 discloses the following exhaust device for a work vehicle. Specifically, this exhaust device for a work vehicle is configured so that: an insulating pipe is externally fitted on the outside of an exhaust guide pipe into which exhaust from an engine is introduced; a cooling pipe is externally fitted in turn on the outside of the insulating pipe; heat in the innermost exhaust guide pipe is insulated by the insulating pipe at an intermediate position; and external air entering in a gap with respect to the outermost cooling pipe having a vent hole positioned on the outside of the insulating pipe cools the insulating pipe and prevents exhaust heat from being transmitted to the outside of the cooling pipe (e.g., see paragraphs 0016, 0025 and FIGS. 2, 3, and 13).

JP-A 07-71249 discloses the following exhaust device for a work vehicle. Specifically, this exhaust device for a work vehicle is configured so that: an exhaust guide pipe into which exhaust from the engine is introduced comprises an upstream-side guide pipe and a downstream-side guide pipe located to the front and to the rear in the direction of exhaust flow; and an ejector section provided between the upstream-side guide pipe and the downstream-side guide pipe causes external air to mix with the exhaust in the downstream-side guide pipe by means of an ejector effect accompanying the inflow of exhaust from the upstream-side guide pipe to the downstream-side guide pipe. The outside of the downstream-side guide pipe is covered by an external protective pipe for insulation (e.g., paragraphs 0020, 0028, FIGS. 4, 5, and 6).

SUMMARY OF THE INVENTION

In the structure set forth in Japanese Patent 3799405, the exhaust pipe is configured from a three-layer structure in which an insulating pipe and a cooling pipe are externally fitted on the outside of an exhaust guide pipe into which exhaust from the engine is introduced; therefore, a problem is presented in that the exhaust pipe is likely to be a large-size pipe having a large diameter. There is a demand for a compact configuration in which an increase in the size of the exhaust pipe is avoided.

According to the structure set forth in JP-A 07-71249, external air is mixed using an ejector effect into the exhaust in the downstream-side guide pipe, whereby the exhaust temperature in the downstream-side guide pipe is reduced, and the outside of the downstream-side guide pipe is covered by an external protective pipe for insulation so that the outside of the exhaust pipe is prevented from overheating.

In this structure, external air sucked in by the ejector section enters the inside of the downstream-side guide pipe, and flows in a state of mixing with the exhaust. Therefore, even though the admixing of external air lowers the exhaust temperature to a certain extent, the temperature of the downstream-side guide pipe, which comes into contact with the exhaust, is substantially high; therefore, it is necessary to provide the external protective pipe for insulation at a position significantly distant from the outer periphery of the downstream-side guide pipe, and it is difficult to sufficiently reduce the diameter of the exhaust pipe.

Also, in an ejector section having this configuration, in order to blow the exhaust out from the terminal end of the downstream-side guide pipe towards a predetermined direction, the terminal end section of the upstream-side guide pipe is narrowed to increase the flow speed of the exhaust where the external air is drawn in. Therefore, pressure loss is generated at this location, resulting in a corresponding energy loss.

With the above-mentioned in view, there is a demand for an exhaust device for a work vehicle having a structure in which an exhaust pipe in which the outside can be prevented from overheating has a compact configuration, external air can be suctioned by an ejector effect in an efficient manner, and high-temperature exhaust can be readily discharged without difficulty.

An exhaust device for a work vehicle according to the present invention comprising: an exhaust pipe for guiding exhaust to a vehicle exterior, the exhaust pipe including: an exhaust guide pipe into which exhaust from an engine is introduced; an external protective pipe that externally fits onto the exhaust guide pipe and forms a passage for external air in a space bounded on one side by the exhaust pipe; and an ejector section for suctioning and introducing external air between an outer periphery of the exhaust guide pipe and an inner periphery of the external protective pipe by an ejector effect caused by exhaust discharged from the exhaust guide pipe, the ejector section being formed on a downstream-side end section of the exhaust pipe by positioning a downstream-side end section of the external protective pipe further downstream, with respect to an exhaust direction, than a downstream-side end section of the exhaust guide pipe; wherein a curved-pipe portion curved so as to change the exhaust direction is provided to the downstream-side end section of the exhaust guide pipe and the external protective pipe, and the spacing between an end-section outer periphery of the exhaust guide pipe and an end-section inner periphery of the external protective pipe in the curved-pipe portion is configured so as to be greater on the side opposite the center of curvature of the curved-pipe portion than the side nearer thereto.

According this configuration, the downstream-side end section of the external protective pipe is positioned further downstream, with respect to the exhaust direction, than the downstream-side end section of the exhaust guide pipe; the ejector section is provided to the downstream-side end section of the exhaust pipe; and external air is suctioned and introduced between the outer periphery of the exhaust guide pipe and the inner periphery of the external protective pipe. Therefore, the external air can be discharged from the downstream-side end section of the exhaust guide pipe while the external air is made to flow between the outer periphery of the exhaust guide pipe and the inner periphery of the external protective pipe.

Therefore, compared to a structure merely comprising a gap between the outer periphery of the exhaust guide pipe and the inner periphery of the external protective pipe, and lacking active flow of external air, it is possible to cause the external air to move in an active manner between the outer periphery of the exhaust guide pipe and the inner periphery of the external protective pipe, and efficiently minimize the transmission of heat from the exhaust guide pipe to the external protective pipe. As a result, it also becomes possible to narrow the spacing between the exhaust guide pipe and the external protective pipe, reduce the diameter of the entire exhaust pipe, and obtain a compact configuration.

Also, the ejector section allows the flow of exhaust discharged directly from the engine to be used as an ejector, in contrast to a structure that produces a loss in pressure, such as that in which a part of the exhaust guide pipe is narrowed and external air is drawn in while the flow speed is increased.

In other words, the downstream-side end section of the external protective pipe is positioned further downstream, with respect to the exhaust direction, than the downstream-side end section of the exhaust guide pipe, whereby a configuration is obtained in which external air present in the pathway between the exhaust guide pipe and the external protective pipe is more susceptible to being drawn into the flow of exhaust discharged from the downstream-side end section of the exhaust guide pipe; therefore, external air can be taken in without any pressure loss caused by narrowing, and it becomes possible to suction external air in an efficient manner that avoids energy loss caused by pressure loss.

The downstream-side end section of the exhaust guide pipe and the external protective pipe comprises a curved-pipe portion that is curved so as to change the exhaust direction, allowing the direction in which the exhaust is discharged to be changed. However, if, as described above, the downstream-side end section of the external protective pipe is positioned further downstream, with respect to the exhaust direction, than the downstream-side end section of the exhaust guide pipe, there is a risk of high-temperature exhaust discharged from the downstream-side end section of the exhaust guide pipe coming into localized contact with the downstream-side end section of the external protective pipe positioned further downstream, with respect to the exhaust direction, than the downstream-side end section of the exhaust guide pipe; and of [the high-temperature exhaust] causing burn damage on the downstream-side end section of the external protective pipe.

Therefore, according to the present invention, taking into account the fact that the flow inertia of the exhaust before reaching the curved-pipe portion has a tendency of acting to turn the flow direction of the exhaust away from the center of curvature of the curved-pipe portion, the spacing between the outer periphery of the end section of the exhaust guide pipe and the inner periphery of the end section of the external protective pipe in the curved-pipe portion is [configured] so as to be greater on the side opposite the center of curvature of the curved-pipe portion than on the side nearer the center of curvature of the curved-pipe portion. The possibility of the exhaust discharged from the downstream-side end section of the exhaust guide pipe coming into contact with the downstream-side end section of the external protective pipe is thereby reduced.

With regards to the above configuration, a terminal-end opening on the downstream-side of the exhaust guide pipe and a terminal-end opening on the downstream-side of the external protective pipe are preferably provided so that, when viewed along the exhaust direction from the terminal-end opening, a center point of the terminal-end opening of the exhaust guide pipe is positioned nearer the center of curvature of the curved-pipe portion than the center point of the terminal-end opening of the external protective pipe.

According to this configuration, the spacing between an end-section outer periphery of the exhaust guide pipe and an end-section inner periphery of the external protective pipe in the curved-pipe portion is configured so as to be greater on the side opposite the center of curvature of the curved-pipe portion than the side nearer thereto, and can be set as expected while the respective cross-section profiles of the exhaust guide pipe and the external protective pipe are kept the same.

Therefore, it is possible to avoid [the need for] a cumbersome procedure during manufacture, such as varying the cross-section profile of the exhaust guide pipe or the external protective pipe to change the spacing.

With regards to the above configuration, the curved-pipe portion of the exhaust guide pipe and the external protective pipe is preferably configured using a member that is separate from the external protective pipe and the exhaust guide pipe positioned further upstream from the curved-pipe portion.

According to the present configuration, it is possible to configure the curved-pipe portion exposed to high-temperature exhaust using a separate member having a higher heat resistance than the external protective pipe positioned upstream of the curved-pipe portion and enhance durability, or to allow the curved-pipe portion to be replaceable as a standalone and increase durability in terms of cost.

With regards to the above configuration, a heat-resistant coating is preferably applied to the curved-pipe portion of the exhaust guide pipe and the external protective pipe.

According to the above configuration, it is possible to increase the heat resistance of the curved-pipe portion exposed to high-temperature exhaust in a relatively simple manner.

DESCRIPTION OF THE PREFERRED EMBODIMENTS

[Overall Configuration of Work Vehicle]

Figure 1:
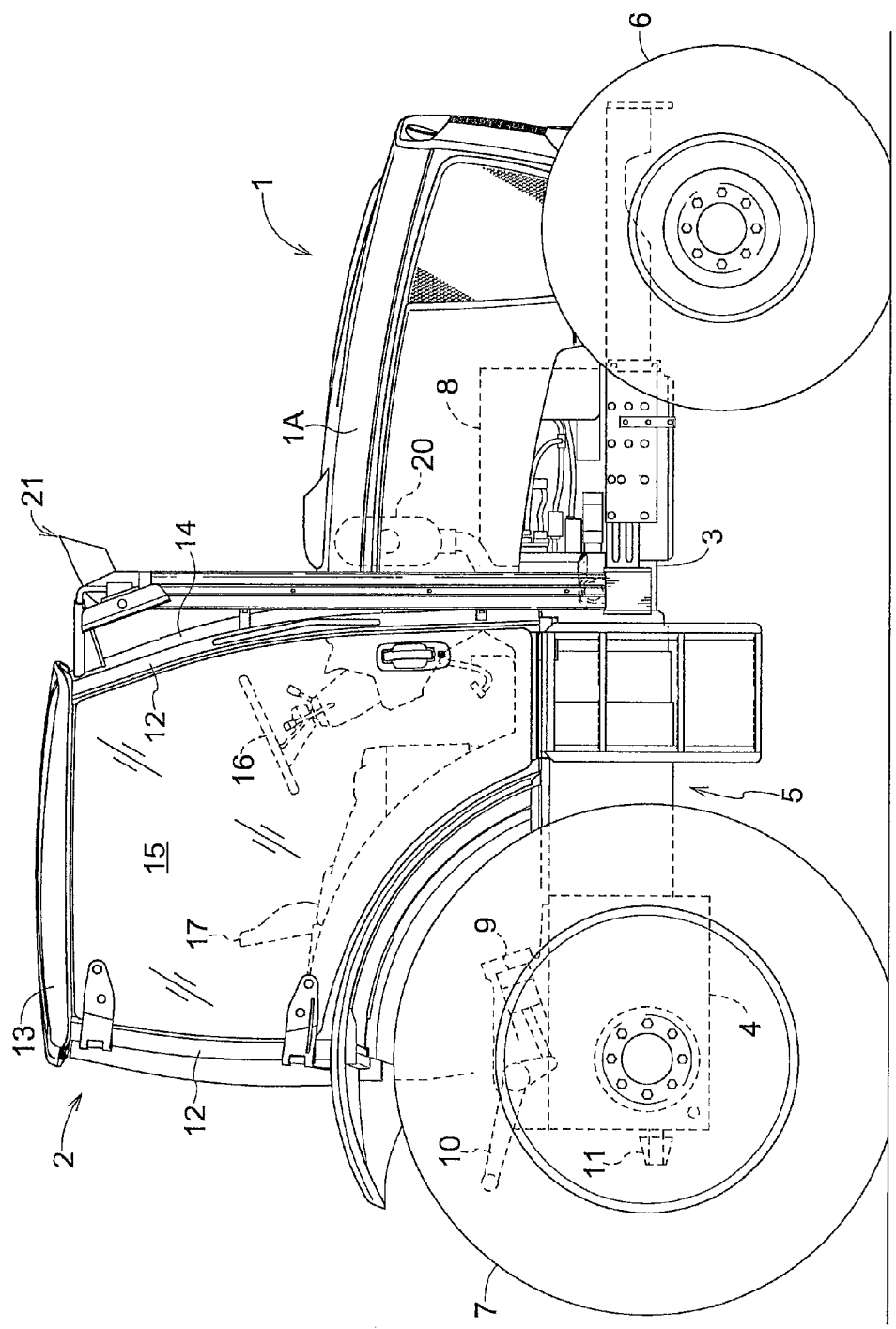
FIG. 1 is an overall side view of a tractor.

FIG. 1 shows an entire side surface of a tractor with a cabin, which is an example of a work vehicle to which the exhaust device according to the present invention is applied. This tractor carries a mobility unit 1 positioned at the front section of the vehicle body, and a driving cabin 2, representing an occupant-carrying driving unit, positioned at the rear section of the vehicle body, on a vehicle body frame 5 configured by integrally linking an engine-carrying frame 3, a clutch housing (not shown), and a transmission case 4. The vehicle body frame 5 is supported by a pair of left and right front wheels 6 and rear wheels 7.

In the mobility unit 1, an engine 8, which is a diesel engine supported in a vibration-proofed manner by an anti-vibration material (not shown), is installed on the engine-carrying frame 3 in an engine compartment covered by an engine bonnet 1A. There is adopted a configuration such that the power from the engine 8 is transmitted to the front wheels 6 and the rear wheels 7 through a travel transmission system comprising a speed-change device for travelling (not shown) and other elements internally provided to the transmission case 4, which also functions as [a part of] the frame, and a four-wheel-drive tractor is obtained.

The rear section of the transmission case 4 is equipped with a pair of left and right lift arms 10 actuated by a hydraulic hoisting cylinder 9 internally provided to the upper rear section of the rear section and driven so as to be capable of swinging in the vertical direction, a power take-off (PTO) shaft 11 that allows the engine power to be drawn out to an outer part; and other components. The power from the engine 8 is transmitted to the power take-off shaft 11 through a work transmission system, which is a different system than the travel transmission system internally provided to the transmission case 4 and which comprises a speed-change device for work (not shown), a work clutch (not shown), and other elements.

A link mechanism (not shown) provided in a linking manner to the rear section of the transmission case 4 so as to be capable of swinging up and down is linked to the left and right lift arms 10. A transmission shaft for relaying power to a rotary tiller or a similar implement (not shown) that is linked to the link mechanism, or a similar component is connected to the power take-off shaft 11.

Figure 2:
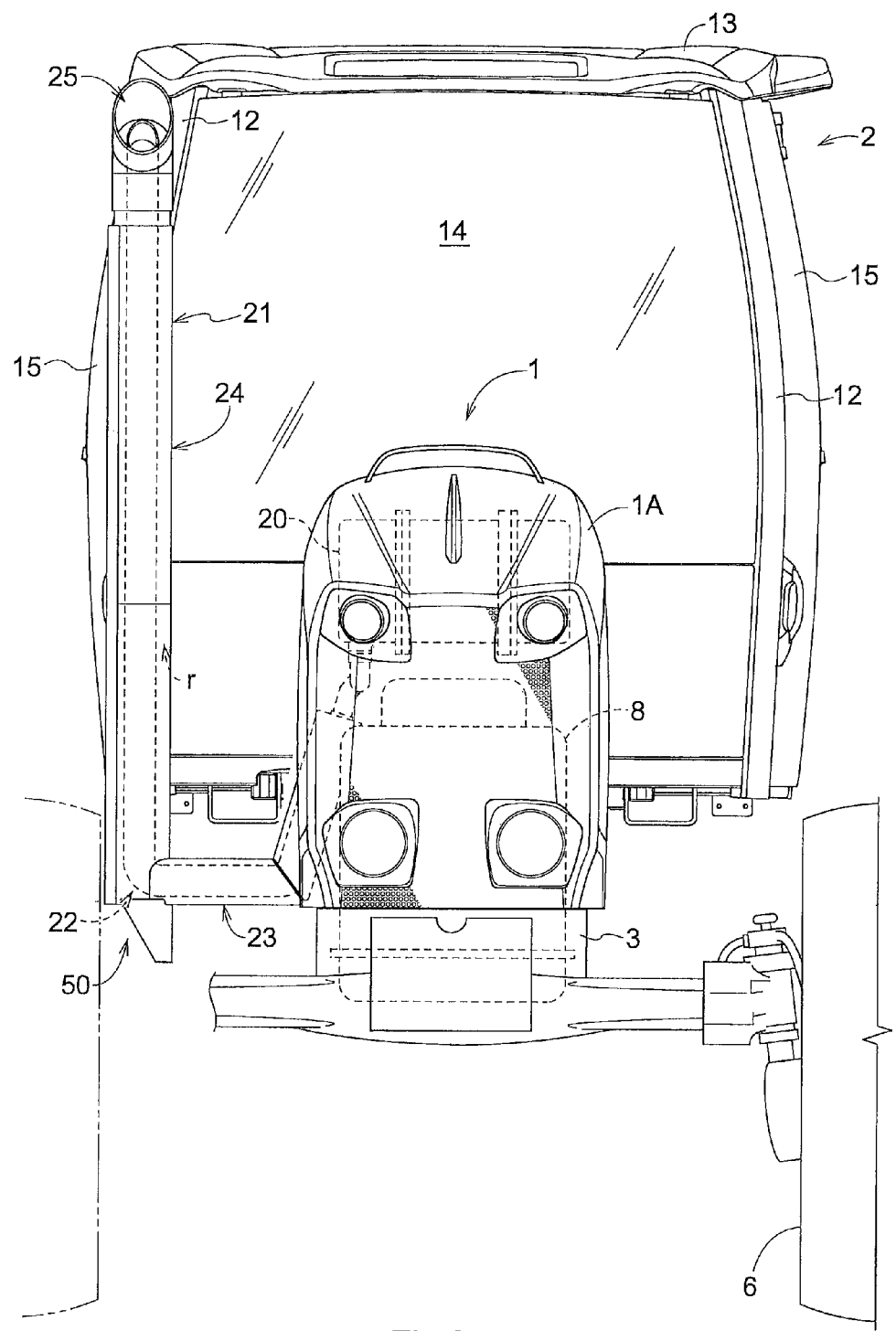
FIG. 2 is an overall front view of the tractor.

As shown in FIGS. 1 and 2, the driving cabin 2 is formed as a rectangular box having a roof material 13 supported by cabin frames 12 that are provided upright at front, rear, left, and right corners; a front surface glass panel 14 comprising a transparent curved-surface glass panel or another glass panel provided to the front side; and a pair of outward-opening left and right door panels 15 made from transparent glass provided to the left and right side sections. The driving cabin 2 is provided with a steering wheel 16, a driving seat 17, and other elements in the interior.

[Exhaust Device]

An exhaust cleaning treatment device 20 with a muffler function is provided in the engine bonnet 1A of the mobility unit 1 so as to be positioned on the upper side of the engine 8, and is designed to accommodate a diesel oxidation catalyst (DOC) and a diesel particulate filter (DPF). The exhaust cleaning treatment device 20 is configured so as to treat the exhaust from the engine 8 and discharge the exhaust towards an exhaust pipe 21.

The exhaust cleaning treatment device 20 is configured so as to capture microparticulate substances contained in the exhaust using the DPF, and cause unburned fuel in the exhaust to oxidize and combust using the DOC to increase the temperature of the exhaust, thereby incinerating the microparticulate substances captured by the DPF to perform recycling in the DPF. As a result, a high-temperature exhaust gas flows in the exhaust pipe 21.

The exhaust pipe 21 is configured so as to comprise a cylindrical exhaust guide pipe 30 into which exhaust from the engine 8 is introduced, and an external protective pipe 40 that externally fits onto to the exhaust guide pipe 30 and forms a pathway r for allowing passage of external air, the pathway r being formed between the external protective pipe 40 and the outer periphery of the exhaust guide pipe 30.

The exhaust device of the present invention is configured from a combination of the above-mentioned exhaust cleaning treatment device 20 and exhaust pipe 21.

[Exhaust Pipe]

Figure 3:
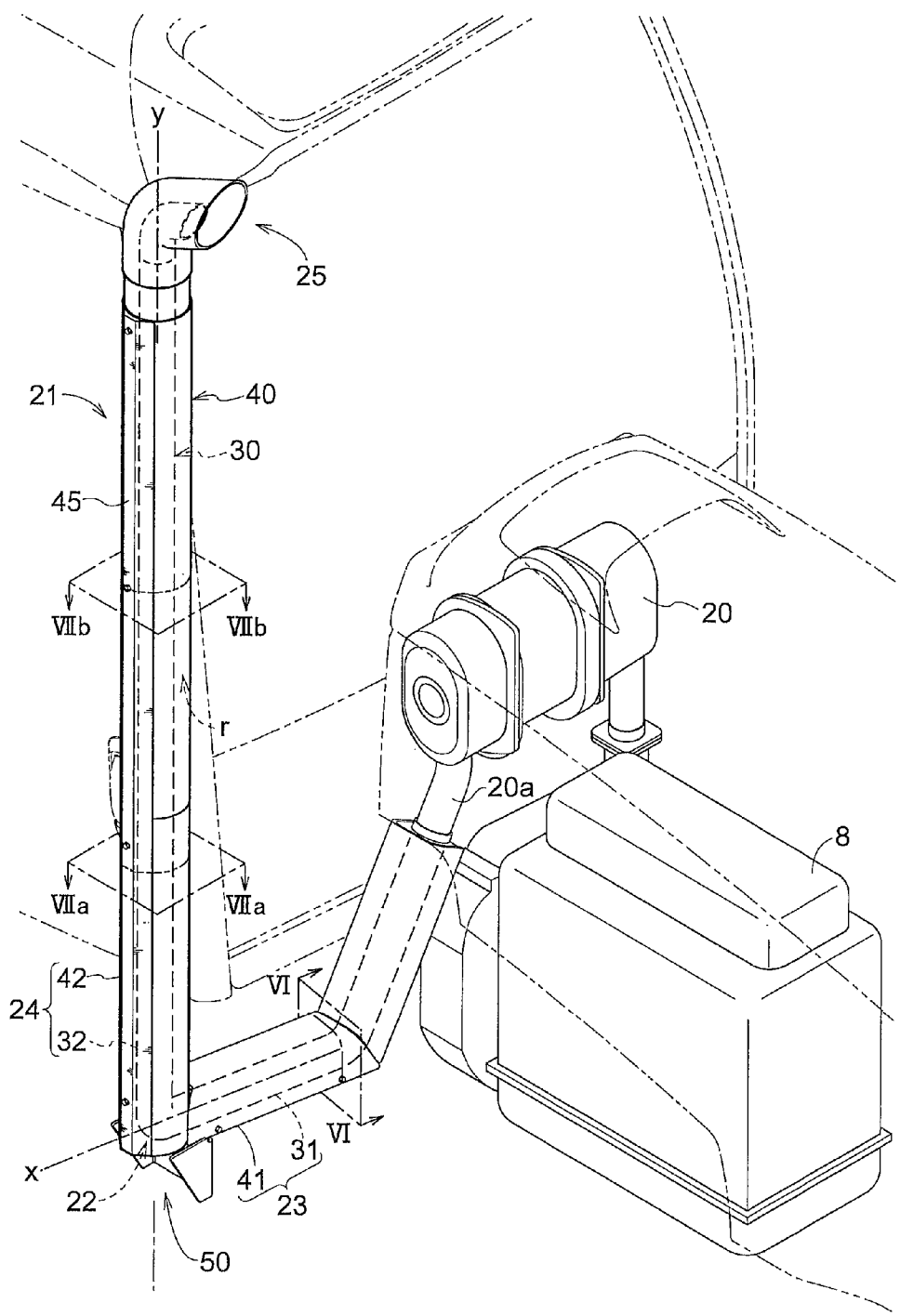
FIG. 3 is a perspective view of an exhaust device.
Figure 4:
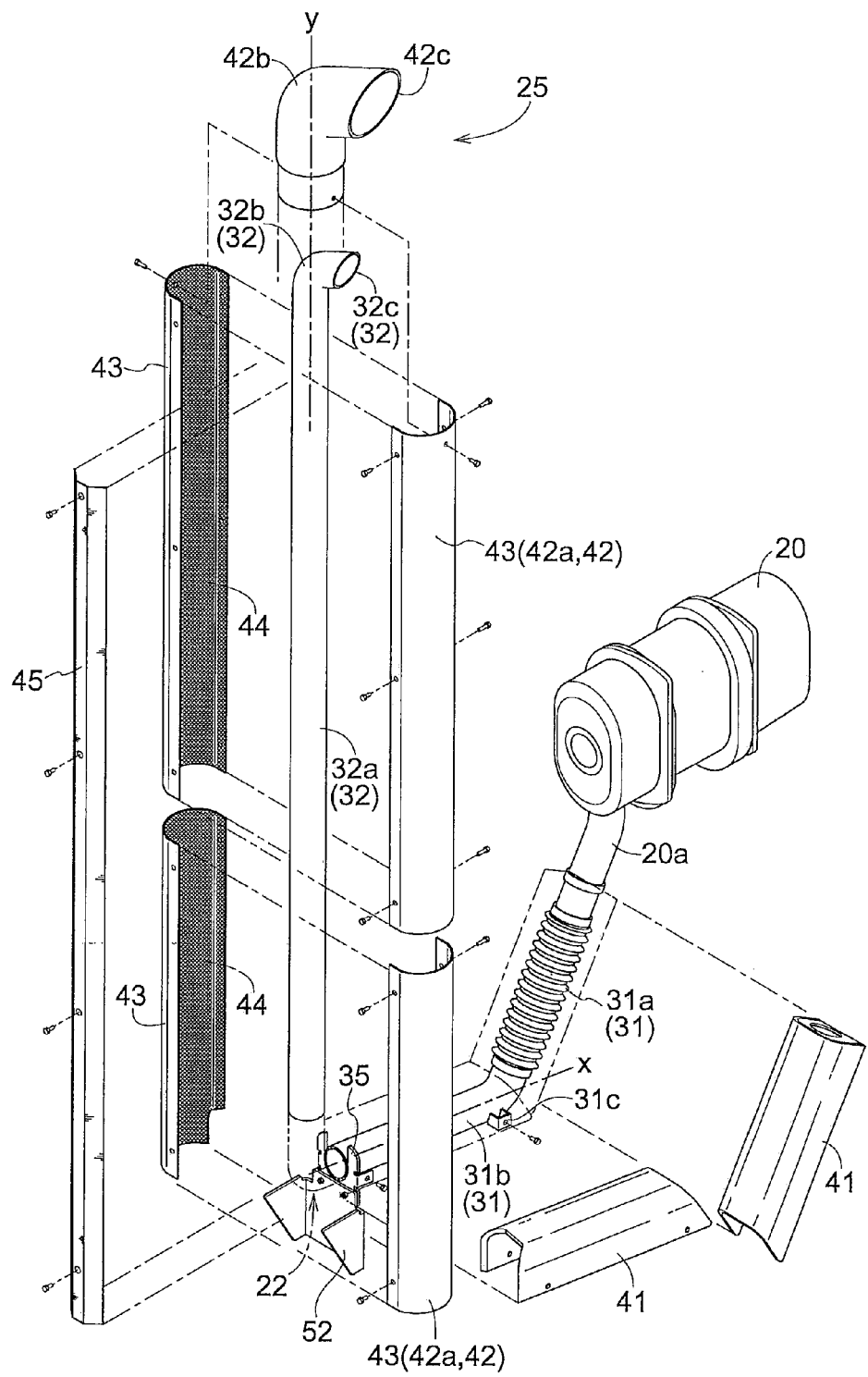
FIG. 4 is an exploded perspective view of the exhaust device.

As shown in FIGS. 3 and 4, the exhaust pipe 21 comprising the exhaust guide pipe 30 and the external protective pipe 40 has a bending section 22 provided at an intermediate position, and is configured so as to change the direction of exhaust gas discharge from the horizontal direction to the vertical direction.

Specifically, the exhaust pipe 21 comprises an upstream-side exhaust pipe 23 positioned on the upstream side of the bending section 22, and a downstream-side exhaust pipe 24 positioned on the downstream side of the bending section 22. The upstream-side end section of the upstream-side exhaust pipe 23 is connected to the exhaust cleaning treatment device 20. Exhaust gas fed from the exhaust cleaning treatment device 20 is discharged from an exhaust section 25 provided to the downstream-side end section of the downstream-side exhaust pipe 24.

There is adopted a configuration in which external air to the pathway r of the exhaust pipe 21 is suctioned and introduced through an external air introduction section 50 provided to a location corresponding to the bending section 22 that is positioned between the downstream-side end section of the upstream-side exhaust pipe 23 and the upstream-side end section of the downstream-side exhaust pipe 24, caused to pass through the pathway r between a downstream-side guide pipe 32 and a downstream-side protective pipe 42 described further below, and discharged from the exhaust section 25 with the exhaust gas.

The upstream-side exhaust pipe 23 comprises an upstream-side guide pipe 31 forming part of the exhaust guide pipe 30, and an upstream-side protective body 41 forming part of the external protective pipe 40. The downstream-side exhaust pipe 24 comprises the downstream-side guide pipe 32 forming part of the exhaust guide pipe 30, and the downstream-side protective pipe 42 forming part of the external protective pipe 40. The bending section 22 represents the location at which the upstream-side guide pipe 31 and the downstream-side guide pipe 32 are connected.

The upstream-side exhaust pipe 23 is configured so as to comprise: the upstream-side guide pipe 31, the upstream side of which is connected to the exhaust cleaning treatment device 20; and the channel-shaped upstream-side protective body 41 covering the upper side of the upstream-side guide pipe 31.

As shown in FIG. 4, the upstream-side guide pipe 31 is configured so as to comprise, between the bending section 22 and the exhaust cleaning treatment device 20, a cylindrical portion 31b having a substantially horizontally oriented cylinder axial center x continuing onto the bending section 22; and a flexible tube 31a positioned further upstream of the horizontally oriented cylindrical portion, and designed so that a location connecting to an exhaust pipe portion 20a of the exhaust cleaning treatment device 20 can be flexed in any direction.

Figures 5A, 5B, 5C:
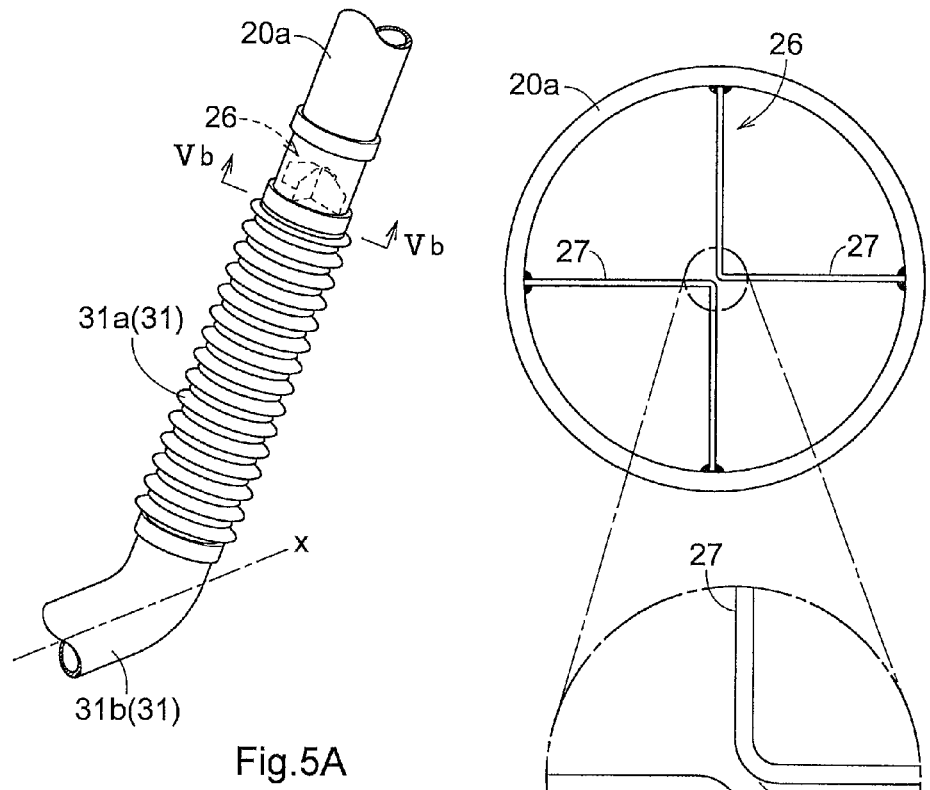
FIG. 5A is a perspective view showing the installation location of a flow regulator.
FIG. 5B is a cross-sectional view along line Vb-Vb in FIG. 5A and a partially expanded view thereof.
FIG. 5C is a perspective view of the flow regulator.

As shown in FIGS. 5A through 5C, flow-regulating plates 26 are provided at a location, in the exhaust pipe portion 20a of the exhaust cleaning treatment device 20, that is fitted into the upstream-side guide pipe 31 and connected to the upstream-side guide pipe 31 by a constricting band (not shown). The flow-regulating plates 26 are attached so that in a state in which respective peak sections of two mountain-shaped plate materials 27 having peaks that are bent substantially at a right angle are caused to face each other in an opposing state and a state in which a small spacing c is present between the peak sections, the foot of each of the mountain-shaped plate materials 27 is welded and secured against the inner periphery side of the exhaust pipe portion 20a; and so that the mountain-shaped plate materials 27 appear as a cross when viewed from the direction of the axial line of the pipe.

As shown in FIG. 5C, an upstream-side edge 27a of each of the flow-regulating plates 26 is formed as an inclined edge tapered so as to be positioned further towards the upstream side with increasing proximity to the center of the exhaust pipe portion 20a in the radial direction, so as to reduce contact resistance with respect to the exhaust gas.

The terminal end section of the exhaust pipe portion 20a to which the flow-regulating plates 26 are attached is connected by being constricted by a constricting band (not shown) from the outside of the upstream-side guide pipe 31 in a state of being fitted into the starting end section of the upstream-side guide pipe 31. There is a tendency for the terminal end section of the exhaust pipe portion 20a to slightly decrease in diameter by being constricted. However, even if the diameter of the terminal end section of the exhaust pipe portion 20a has decreased in diameter, the spacing c is present between the peak sections of the flow-regulating plates 26, and the exhaust pipe portion 20a can therefore be reduced in diameter without difficulty by slightly decreasing the width of the spacing c. Therefore, there is little risk of the exhaust pipe portion 20a being deformed to a warped shape, there will be few instances in which the exhaust pipe portion 20a decreases in diameter while deforming to a warped shape at the location of fitting with the upstream-side guide pipe 31 so that a gap is generated bounded on one side by the upstream-side guide pipe, and anomalous events such as leakage of the exhaust gas can be readily avoided.

Figure 6:
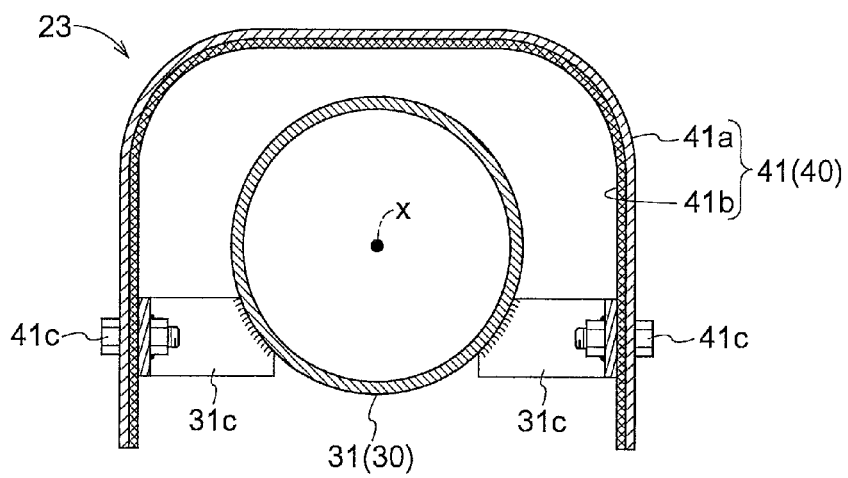
FIG. 6 is a cross-sectional view along line VI-VI in FIG. 3.

Within the upstream-side exhaust pipe 23, the upstream-side protective body 41 formed to a channel shape has a sheet-shaped insulating material 41b attached by riveting to the inside of a channel-shaped outer cover 41a, the lower side of which is open, as shown in FIGS. 3, 4, and 6. The sheet-shaped insulating material 41b is created by forming an aluminum corrugated material, and has heat-proofing and sound-proofing functions.

The upstream-side protective body 41 is installed across a range covering: the substantially horizontally oriented cylindrical portion 31b continuing to the bending section 22; and the flexible tube 31a continuing to the horizontally oriented cylindrical portion 31b, the flexible tube 31a positioned on the outside of the engine bonnet 1A.

With regards to the upstream-side protective body 41, the open-end side of a connecting piece 31c, which is formed to a channel shape in plan view, is secured by welding to the outer periphery section of the lower half of the upstream-side guide pipe 31; and the other end of the connecting piece 31c is extended outward, in the horizontal direction, with respect to the outer periphery of the upstream-side guide pipe 31, and detachably linked and secured by a securing bolt 41c in a state of being held against the inner periphery side of the upstream-side protective body 41.

As shown in FIGS. 3, 4, 7A, and 7B, the downstream-side exhaust pipe 24 is configured so as to comprise: the downstream-side guide pipe 32 stretching from the bending section 22 to the exhaust section 25 of the downstream-side end section; the downstream-side protective pipe 42 (corresponding to the external protective pipe 40) covering the outer periphery side of the downstream-side guide pipe 32; and a side-section cover 45.

The downstream-side guide pipe 32 is configured so as to comprise: a cylindrical straight-pipe portion 32a provided upright so as to have a cylinder axial center y disposed in the vertical direction; and a curved-pipe portion 32b that is positioned on the upper end section of the straight-pipe portion 32a and that is curved so as to be oriented in a predetermined direction (front side).

The lower end section of the straight-pipe portion 32a links to the bending section 22. The curved-pipe portion 32b is provided to the upper end section of the straight-pipe portion 32a. The upper end of the curved-pipe portion 32b opens to the exterior and forms a terminal-end opening 32c.

The downstream-side protective pipe 42 comprises a straight-pipe-shaped cover portion 42a formed to a straight pipe shape so as to be positioned on the outer periphery side of the straight-pipe portion 32a of the downstream-side guide pipe 32, and a curved-pipe portion 42b connected to the upper end section of the straight-pipe-shaped cover portion 42a.

Figures 7A, 7B:
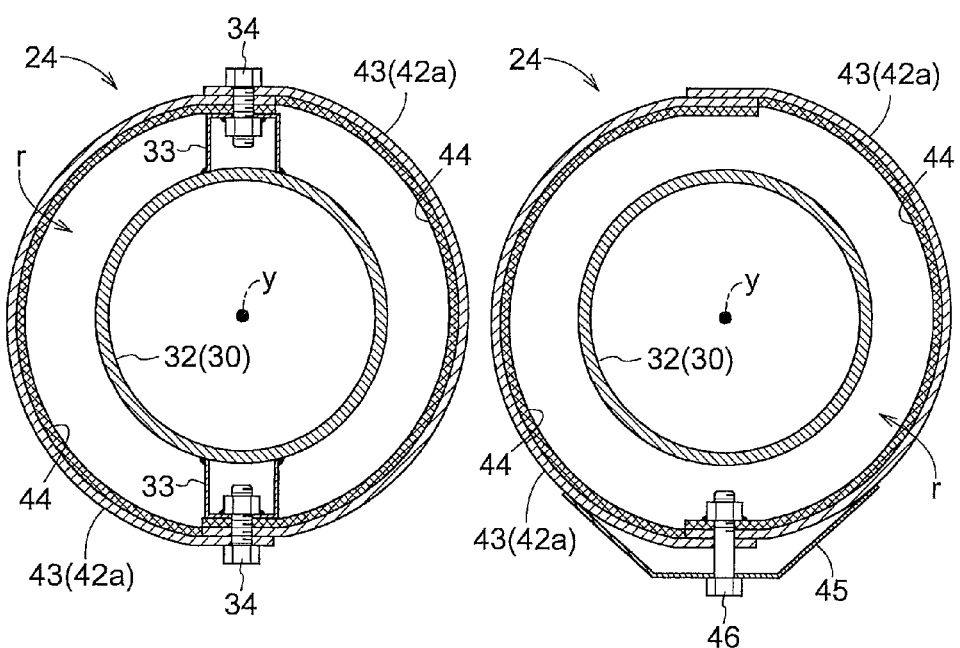
FIG. 7A is a cross-sectional view along line VIIa-VIIa in FIG. 3 showing the downstream-side exhaust pipe.
FIG. 7B is a cross-sectional view along line VIIb-VIIb in FIG. 3 showing the downstream-side exhaust pipe.

The straight-pipe-shaped cover portion 42a is formed so that a pair of front and rear half-cylindrical members 43, 43 form a cylindrical straight pipe that stands upright along the cylinder axial center y disposed in the vertical direction in a state in which split-surface edge portions of the half-cylindrical members 43 are positioned against each other. As shown in FIG. 7A, the half-cylindrical members 43, 43 are positioned on the outside of channel-shaped attachment brackets 33, 33 provided to the outer peripheral portion on left and right sides of the downstream-side guide pipe 32, and linked and secured in a fastened state by linking bolts 34 in a state in which respective edges are positioned against each other.

A sheet-shaped insulating material 44 is also attached by means of riveting to the inner peripheral surface side of each of the half-cylindrical members 43, 43. However, in the sheet-shaped insulating material 44, the inner peripheral surface side that faces the external air pathway r is formed as a relatively smooth surface in comparison to the sheet-shaped insulating material 41b provided to the inside of the outer cover 41a of the upstream-side protective body 41.

Specifically, the sheet-shaped insulating material 41b provided to the inside of the outer cover 41a of the upstream-side protective body 41 has an uneven shape on the inner surface side on the inner periphery side of the outer cover 41a, and has a structure in which insulating and soundproofing functions are enhanced. In contrast, even though the sheet-shaped insulating material 44 on the inner peripheral surface side of the half-cylindrical members 43, 43 is obtained by forming an aluminum corrugated material, the sheet-shaped insulating material 44 is formed so that a relatively smooth surface having little unevenness is present on the inner peripheral surface side facing the pathway r. This is to prevent the flow of external air from the external air introduction section 50 below to the exhaust section 25 above from being inhibited.

As shown in FIG. 4, the pair of front and rear half-cylindrical members 43, 43 forming the straight-pipe-shaped cover portion 42a are also divided into two in the vertical direction. The half-cylindrical members 43, 43 positioned at the lower section and the half-cylindrical members 43, 43 positioned at the upper section are installed in a state in which the respective upper ends and lower ends face each other in an opposing state in the cylinder axial center y-direction.

Each of the half-cylindrical members 43, 43 positioned at the lower section and the half-cylindrical members 43, 43 positioned at the upper section is linked and secured, in a fastened state, by linking bolts 34 in a state in which respective edges are positioned against each other, to the channel-shaped attachment brackets 33, 33 provided to the outer peripheral portion on the left and right sides of the downstream-side guide pipe 32, as described above.

The curved-pipe portion 42b connected to the upper end section of the straight-pipe-shaped cover portion 42a is configured from an elbow pipe that is curved so that the lower-end side externally fits onto the upper end section of the straight-pipe-shaped cover portion 42a, and the exhaust direction in the terminal-end opening 42c formed on the upper-end side (see center lines p1, p2 in FIG. 9A) is oriented diagonally upwards towards the front of the vehicle body.

The curved-pipe portion 42b of the downstream-side protective pipe 42 is positioned so as to enclose the outer periphery side of the curved-pipe portion 32b of the downstream-side guide pipe 32, is provided with a heat-resistant coating applied to the inner peripheral surface side so as to obtain a higher heat resistance than that of the straight-pipe-shaped cover portion 42a, and is detachably attached to the upper end section of the straight-pipe-shaped cover portion 42a by a linking bolt or other appropriate linking means (not shown).

The side-section cover 45 positioned on the outside, in the lateral direction, of the straight-pipe-shaped cover portion 42a comprises a series of plate materials that have a gutter shape in which the opening-side spreads outwards in cross-section, as shown in FIGS. 3, 4, and 7B. The plate materials are positioned on the outside, in the lateral direction, of the location at which the edge portions on the split-surface side of the half-cylindrical members 43, 43 are positioned against each other; and extend from the upper end to the lower end of the straight-pipe-shaped cover portion 42a so as to cover the location at which the edge portions are positioned against each other.

The side-section cover 45 is linked and secured to the straight-pipe-shaped cover portion 42a by a separate linking bolt 46 at a location positioned differently in the vertical direction than the location at which the front and rear half-cylindrical members 43, 43 are linked and secured to the attachment brackets 33, 33 in a state in which the respective edges are positioned against each other.

[External Air Introduction Section]

As described above, the exhaust pipe 21 is configured so as to comprise the bending section 22 at an intermediate position so that the direction in which the exhaust gas is discharged is changed from the horizontal direction to the vertical direction. The external air introduction section 50 for taking external air into the external air pathway r in the downstream-side exhaust pipe 24 that is positioned further downstream of the bending section 22 is installed near the bending section 22.

Figure 8:
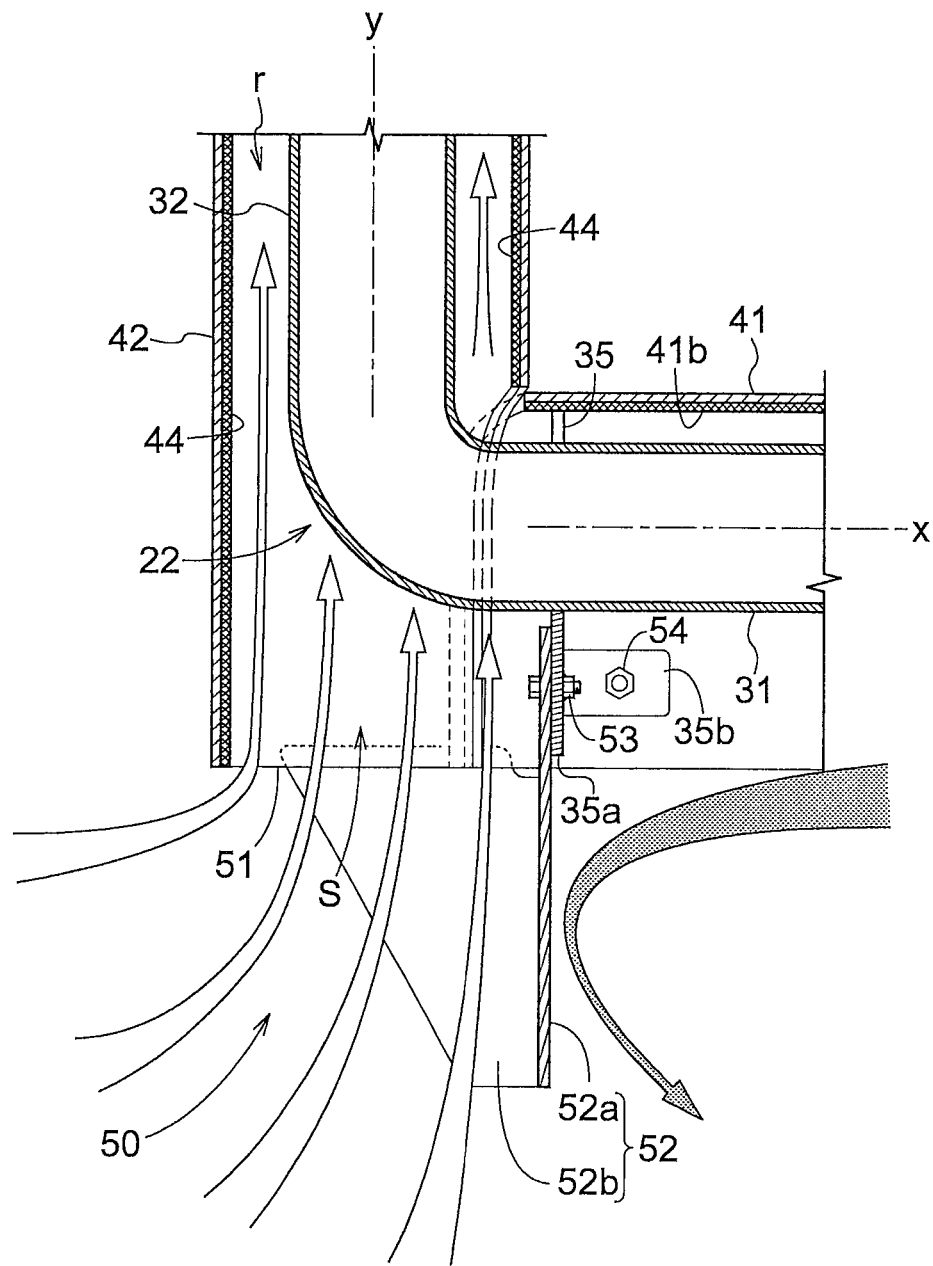
FIG. 8 is a cross-sectional view along the vertical direction showing the external air introduction section at the bending section.

The external air introduction section 50 introduces external air into the pathway r formed between the downstream-side guide pipe 32 and the downstream-side protective pipe 42 positioned so that a spacing is present with respect to the outer periphery of the downstream-side guide pipe 32. As shown in FIG. 8, the lower-end side of the downstream-side protective pipe 42 is extended further downwards than the location at which the bending section 22 of the exhaust guide pipe 30 is present. An upper-section shielding member 35, which forms a part of the shielding member described further below, is provided at a location near the bending section 22 of the upstream-side guide pipe 31.

The lower-end side of the downstream-side protective pipe 42 is thereby provided with the external air introduction section 50, in which a lower-end edge 42d of the downstream-side protective pipe 42 and a lower-end edge 35a of the upper-section shielding member 35 form a downward-opening air intake 51, the external air introduction section 50 being configured so that external air is taken in from the air intake 51.

As shown in FIGS. 4 and 8, the upper-section shielding member 35 is secured to the inside of the upstream-side protective body 41 at a position near the bending section 22 of the upstream-side guide pipe 31.

Specifically, the upper section of the upper-section shielding member 35 has formed thereon a U-shaped opening that can be fitted from below the upstream-side guide pipe 31. In a state in which this U-shaped opening is fitted so as to be in contact with the front and rear lateral side sections and the lower section of the upstream-side guide pipe 31, the upper end of the U-shaped opening is in contact with the upper section of the inner surface of the upstream-side guide pipe 31, and the lateral side edges of the upper-section shielding member 35 are positioned against the inner surface at the front and rear of the upstream-side guide pipe 31.

In this state, an attachment piece 35b provided consecutively on the lateral side section of the upper-section shielding member 35, and the front and rear lateral side portions of the upstream-side protective body 41 are detachably linked and secured by a linking bolt 54.

In the external air introduction section 50, the downstream-side protective pipe 42 extending further downwards than the location at which the bending section 22 of the exhaust guide pipe 30 is present, and the upper-section shielding member 35 form a space s in which the exhaust guide pipe 30 and the bending section 22 thereof are not present, the space s being between the bending section 22 of the exhaust guide pipe 30 and the air intake 51. As a result, an air intake path, in which narrowing of the flow path by the presence of the exhaust guide pipe 30 or the bending section 22 thereof does not occur, is formed in the external air introduction section 50; and external air can be introduced in a smooth manner into the pathway r formed between the downstream-side guide pipe 32 and the downstream-side protective pipe 42.

A lower-section shielding member 52 extending considerably further downwards than the air intake 51 is linked by a linking bolt 53 to the lower-end side of the upper-section shielding member 35 positioned against the inner-surface side of the upstream-side protective body 41.

The lower-section shielding member 52 comprises a shielding surface 52a disposed along the extension direction of the surface of the upper-section shielding member 35 that is disposed along the vertical direction, and side-shielding surfaces 52b positioned on both front and rear sides of the air intake 51. A state is obtained in which shielding is present in three directions excluding the outward side in the lateral direction of the vehicle body, external air can readily move in from the downward side and the outward side in the lateral direction of the vehicle body, and hot air from the engine 8 is restricted from entering the side towards the air intake 51 from the vehicle-body-interior side where the engine 8 is present.

The upper-section shielding member 35 and the lower-section shielding member 52 form a shielding member for minimizing the flow of hot air from the side towards the engine 8 to the side towards the external air introduction section 50.

The downward extension of the lower-section shielding member 52 is set to dimensions at which hot air from the engine 8, which has been guided by the presence of the channel-shaped upstream-side protective body 41 to the vicinity of the air intake 51, is prevented from flowing around the lower end of the lower-section shielding member 52 and reaching the air intake 51 even if some of the hot air flows outwards with respect to the vehicle body in the course of the hot air leaking out and rising from the open lower-edge side of the upstream-side protective body 41.

[Exhaust Section]

The exhaust section 25, which also functions as an ejector section for suctioning and introducing external air between the outer periphery of the downstream-side guide pipe 32 and the inner periphery of the downstream-side protective pipe 42 by an ejector effect caused by exhaust discharged from the terminal-end opening 32c of the downstream-side guide pipe 32, is provided to the downstream-side end section of the exhaust pipe 21.

Specifically, as shown in FIGS. 3, 4, 9A, and 9B, the exhaust section 25 is configured so that: the curved-pipe portion 42b of the downstream-side protective pipe 42 comprising an elbow pipe that is externally fitted to the upper end section of the straight-pipe-shaped cover portion 42a of the downstream-side protective pipe 42 is provided, in a state of enclosing the outer periphery side of the curved-pipe portion 32b positioned in a continuing manner on the upper end section of the straight-pipe portion 32a of the downstream-side guide pipe 32 provided upright so as to have a cylinder axial center y disposed in the vertical direction, to the outside of the curved-pipe portion 32b; and the external air pathway r is present between the outer periphery side of the curved-pipe portion 32b of the downstream-side guide pipe 32 and the inner periphery side of the curved-pipe portion 42b of the downstream-side protective pipe 42.

The terminal-end opening 32c, which is at the downstream-side end section of the curved-pipe portion 32b positioned in a continuing manner on the upper end section of the straight-pipe portion 32a of the downstream-side guide pipe 32, is positioned further upstream than the position of a terminal opening 42c positioned at the downstream-side end section of the curved-pipe portion 42b of the downstream-side protective pipe 42. Exhaust emitted from the terminal-end opening 32c of the downstream-side guide pipe 32 is thereby discharged while external air present in the external air pathway r on the outer periphery side of the downstream-side guide pipe 32 is suctioned and guided out. Flow of external air is generated by an ejector effect in the external air pathway r between the outer periphery side of the downstream-side guide pipe 32 and the inner periphery side of the downstream-side protective pipe 42, and the downstream-side guide pipe 32 can be cooled up to the terminal-end opening 32c.

Figure 9A:
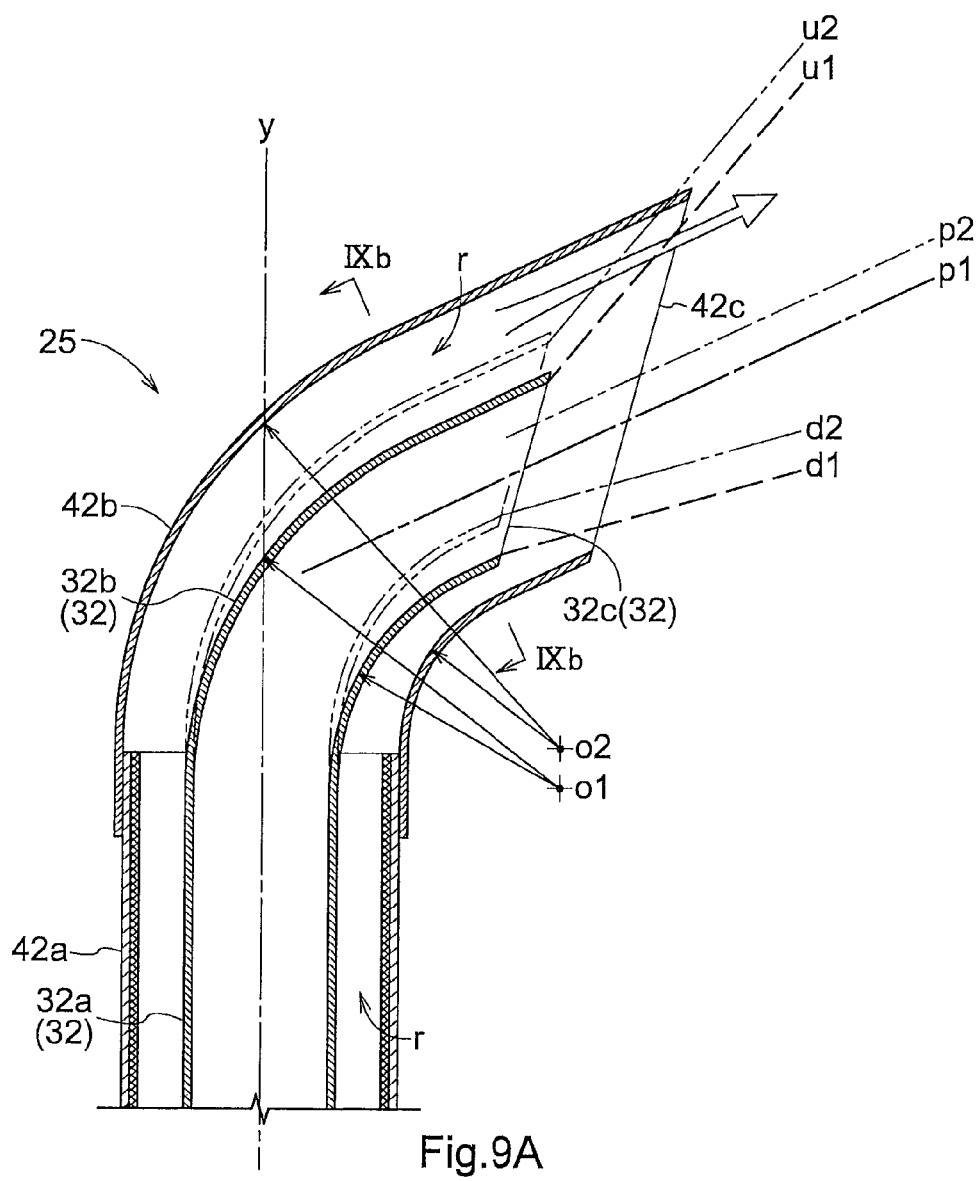
FIG. 9A is a vertical cross-sectional view along the longitudinal direction showing the downstream-side end section of the exhaust device.
Figure 9B:
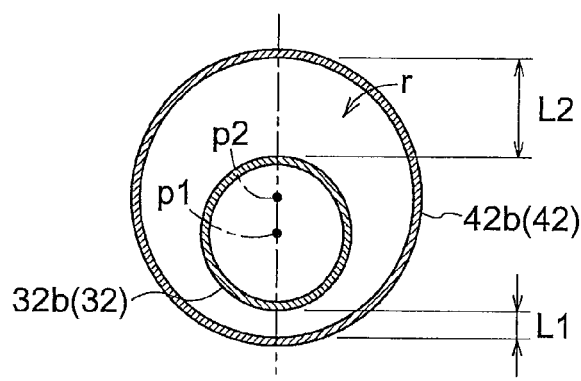
FIG. 9B is a cross-sectional view along line IXb-IXb in FIG. 9A.

In the exhaust section 25, the spacing between the outer periphery position of the downstream-side end section of the curved-pipe portion 32b of the downstream-side guide pipe 32 and the inner periphery position of the downstream-side end section of the curved-pipe portion 42b of the downstream-side protective pipe 42, i.e., the width of the external air pathway, is set as shown in FIGS. 9A and 9B.

Specifically, as regards the spacing between the outer periphery position of the downstream-side end section of the curved-pipe portion 32b of the downstream-side guide pipe 32 and the inner periphery position of the downstream-side end section of the curved-pipe portion 42b of the downstream-side protective pipe 42, the positional relationship between the curved-pipe portion 32b of the downstream-side guide pipe 32 and the curved-pipe portion 42b of the downstream-side protective pipe 42 is set so that the pathway width L2 in the upper side further from the respective centers of curvature o1, o2 of the curved-pipe portions 32b, 42b is greater than the pathway width L1 in the lower side nearer the centers of curvature o1, o2.

Here, when viewed from each of the terminal-end openings 32c, 42c along the exhaust direction (see line segments p1, p2 shown in FIG. 9A), the relative positions of each of the curved-pipe portions 32b, 42b having a circular cross-section profile are set so that the center point p1 (located on line segment p1 shown in FIG. 9A and therefore indicated by the same numeral) of the terminal-end opening 32c of the downstream-side guide pipe 32 is located further downward, nearer the respective centers of curvature o1, o2 of the curved-pipe portions 32b, 42b, than the center point p2 (located on line segment p2 shown in FIG. 9A and therefore indicated by the same numeral) of the terminal opening 42c of the downstream-side protective pipe 42, as shown in FIG. 9B.

It is assumed that, in cases in which the terminal-end opening 32c of the downstream-side guide pipe 32 is located at the same position as the center point p2 of the terminal opening 42c of the downstream-side protective pipe 42 as shown by the imaginary lines in FIG. 9A, high-temperature exhaust gas is discharged from the terminal-end opening 32c of the downstream-side guide pipe 32 into a vertically oriented discharge region within a range indicated in the drawing by dashed two-dotted lines u2, d2. In such an instance, there is a possibility that the upper-end side location of the discharge region indicated by the upper dashed two-dotted line u2 will come into contact with the upper side of the terminal opening 42c of the downstream-side protective pipe 42.

In contrast, in cases in which the center point p1 of the terminal-end opening 32c of the downstream-side guide pipe 32 is located further downwards and nearer the centers of curvature o1, o2 than the center point p2 of the terminal opening 42c of the downstream-side protective pipe 42 as shown by a solid line in FIG. 9A, it is assumed that the high-temperature exhaust gas discharged from the terminal-end opening 32c of the downstream-side guide pipe 32 will be discharged into a vertically oriented discharge region within a range indicated in the drawing by dashed two-dotted lines u1, d1. In such an instance, it is possible to reduce the possibility of a part of the upper dotted line u1 coming into contact with the upper side of the terminal opening 42c of the downstream-side protective pipe 42.

In the above embodiment, a diesel engine comprising the exhaust cleaning treatment device 20 with a muffler function accommodating a diesel oxidation catalyst (DOC) and a diesel particulate filter (DPF) is employed as the engine 8. However, [the present invention] is not limited thereto, and can be applied to an exhaust device for a work vehicle in which a gasoline engine is employed.

Other structures may be configured in a similar manner to that in the embodiment described above.

In the above embodiment, a sheet-shaped insulating material obtained by forming an aluminum corrugated material and imparting heat-proofing and sound-proofing functions thereto is used as the sheet-shaped insulating material 41b provided to the inner surface side of the external protective pipe 40. However, [the present invention] is not limited thereto, and any appropriate insulating material can be employed. A configuration is also possible in which no insulating material is used.

Other structures may be configured in a similar manner to that in the embodiment described above.

In the above embodiment, the curved-pipe portion 42b of the downstream-side protective pipe 42 is configured using a member separate from the straight-pipe-shaped cover portion 42a, and is provided with a heat-resistant coating applied to the inner periphery side. However, [the present invention] is not limited thereto; for example, the following configuration is also possible.

For example, the curved-pipe portion 42b may be integrally configured with the straight-pipe-shaped cover portion 42a, and a heat-resistant coating may be applied to the inner periphery side of the curved-pipe portion 42b where the sheet-shaped insulating material 44 is not attached; the curved-pipe portion 42b configured using a member separate from the straight-pipe-shaped cover portion 42a may be made from a heat-resistant material; heat-resistant coating may further be applied to the curved-pipe portion 42b made from a heat-resistant material and configured using a separate member, or similar means may be implemented.

Other structures may be configured in a similar manner to that in the embodiment described above.

In the above embodiment, the curved-pipe portion 32b of the downstream-side guide pipe 32 and the curved-pipe portion 42b of the downstream-side protective pipe 42 are configured using curved-pipe portions 32b, 42b, each of which having a circular cross-section profile. The positions of the respective center points p1, p2 of the terminal-end openings 32c, 42c are displaced along the vertical direction, whereby the widths L1, L2 of the external air pathway r formed between each of the curved-pipe portions 32b, 42b are made to differ above and below the curved-pipe portion 32b of the downstream-side guide pipe 32.

In other words, the positional relationship between the curved-pipe portion 32b of the downstream-side guide pipe 32 and the curved-pipe portion 42b of the downstream-side protective pipe 42 is set so that the pathway width L2 in the upper side further from the respective centers of curvature o1, o2 of the curved-pipe portions 32b, 42b is greater than the pathway width L1 in the lower side nearer the centers of curvature o1, o2. However, [the present invention] is not limited thereto; for example, one or both of the curved-pipe portions 32b, 42b may have an elliptical or a similarly shaped cross-section so that the widths L1, L2 of the external air pathway r formed between the curved-pipe portions 32b, 42b differ above and below the curved-pipe portion 32b of the downstream-side guide pipe 32.

In the above embodiment, an example is given for a structure in which the lower-section shielding member 52 of the external air introduction section 50 is supported by the upper-section shielding member 35 provided near the bending section 22 of the upstream-side guide pipe 31. However, the structure for supporting the lower-section shielding member 52 is not limited to that shown. For example, support may be provided by the upstream-side protective body 41, the downstream-side protective pipe 42, or at another appropriate location, as long as the structure does not block introduction of external air from the air intake 51 and is capable of minimizing the flowing around of hot air from the side towards the engine 8. It is also possible to omit the lower-section shielding member 52. Also, support of the upper-section shielding member 35 may be provided not only by the upstream-side protective body 41 but also by the upstream-side guide pipe 31 or at another appropriate location.

The upper-section shielding member 35 and the lower-section shielding member 52 are not limited to those configured using different members, and may be integrally formed using a single member, or formed as a combination of three or more separate members.

Other structures may be configured in a similar manner to that in the embodiment described above.

In the above embodiment, the exhaust pipe portion 20a of the exhaust cleaning treatment device 20 is equipped with the flow-regulating plates 26. However, [the present invention] is not limited thereto. For example, the interior of the exhaust pipe portion 20a may be equipped with a mesh filter comprising a large number of vent holes, or another structure may be provided in which it is easy to avoid the occurrence of cavitation generated by a vortex of exhaust accompanying a boost in acceleration during excess load. The flow-regulating plates 26, the mesh filter, or another such structure for avoiding the occurrence of cavitation may also be omitted.

Other structures may be configured in a similar manner to that in the embodiment described above.

The exhaust device for a work vehicle according to the present invention can be applied not only to a tractor but also to a combine harvester or other mobile agricultural machinery; an excavator or other type of building machinery or construction machinery; a goods transportation vehicle; or other work vehicles.

What is claimed is:

1. An exhaust device for a work vehicle comprising:
an exhaust pipe for guiding exhaust to a vehicle exterior, the exhaust pipe including:
an exhaust guide pipe into which exhaust from an engine is introduced;
an external protective pipe that externally fits onto the exhaust guide pipe and forms a passage for external air in a space bounded on one side by the exhaust pipe; and
an ejector section for suctioning and introducing external air between an outer periphery of the exhaust guide pipe and an inner periphery of the external protective pipe by an ejector effect caused by exhaust discharged from the exhaust guide pipe, the ejector section being formed on a downstream-side end section of the exhaust pipe by positioning a downstream-side end section of the external protective pipe further downstream, with respect to an exhaust direction, than a downstream-side end section of the exhaust guide pipe;
wherein:
a curved-pipe portion curved so as to change the exhaust direction is connected to the downstream-side end section of each of the exhaust guide pipe and the external protective pipe, respectively, and
spacing between an end-section outer periphery of the exhaust guide pipe and an end-section inner periphery of the external protective pipe in the curved-pipe portions is greater on a side opposite the center of curvature of the respective curved-pipe portions than the side nearer the center of curvature.

2. The exhaust device for a work vehicle according to claim 1, wherein a terminal-end opening on the downstream-side of the exhaust guide pipe and a terminal-end opening on the downstream-side of the external protective pipe are provided so that, when viewed along the exhaust direction from the terminal-end opening, a center point of the terminal-end opening of the exhaust guide pipe is positioned nearer the center of curvature of the curved-pipe portion connected to the exhaust guide pipe than the center point of the terminal-end opening of the external protective pipe.

3. The exhaust device for a work vehicle according to claim 1, wherein the curved-pipe portions of the exhaust guide pipe and the external protective pipe are each configured using a curved member that is separate from the external protective pipe and the exhaust guide pipe.

4. The exhaust device for a work vehicle according to claim 1, wherein a heat-resistant coating is applied to the curved-pipe portions of the exhaust guide pipe and the external protective pipe.

5. The exhaust device for a work vehicle according to claim 1, wherein a terminal-end opening of the curved-pipe portion of the exhaust guide pipe is positioned further upstream than a terminal opening of the curved-pipe portion of the external protective pipe.

* * * * *